(12) United States Patent
Jitaru et al.

(10) Patent No.: US 10,103,639 B2
(45) Date of Patent: Oct. 16, 2018

(54) SOFT SWITCHING CONVERTER BY STEERING THE MAGNETIZING CURRENT

(71) Applicant: ROMPOWER ENERGY SYSTEMS, INC., Tucson, AZ (US)

(72) Inventors: Ionel Jitaru, Tucson, AZ (US); Marco Antonio Davila, Tucson, AZ (US)

(73) Assignee: ROMPOWER TECHNOLOGY HOLDINGS, LLC, Milford, DE (US)

( * ) Notice: Subject to any disclaimer, the term of this patent is extended or adjusted under 35 U.S.C. 154(b) by 236 days.

(21) Appl. No.: 14/274,701

(22) Filed: May 10, 2014

(65) Prior Publication Data

US 2014/0334188 A1    Nov. 13, 2014

Related U.S. Application Data

(60) Provisional application No. 61/821,896, filed on May 10, 2013.

(51) Int. Cl.
| | |
|---|---|
| *H02M 3/337* | (2006.01) |
| *H02M 3/335* | (2006.01) |
| *H02M 1/00* | (2006.01) |

(52) U.S. Cl.
CPC ..... *H02M 3/3376* (2013.01); *H02M 3/33576* (2013.01); *H02M 2001/0058* (2013.01); *Y02B 70/1491* (2013.01)

(58) Field of Classification Search
CPC ......... H02M 3/33576; H02M 3/33546; H02M 3/3376; H02M 2001/0058; Y02B 70/1491
See application file for complete search history.

(56) References Cited

U.S. PATENT DOCUMENTS

| | | | | |
|---|---|---|---|---|
| 7,196,914 B2* | 3/2007 | Ren | ................... | H02M 3/33569 363/17 |
| 2009/0231884 A1* | 9/2009 | Bong | ..................... | H02M 3/28 363/17 |

OTHER PUBLICATIONS

Shoyama et al., Nov. 1991, IEEE, INTLEC. 1991, 640-647.*
Choi, Jan. 2007, Joutnal of Power Electronics, vol. 7, No. 1, 13-20.*

* cited by examiner

*Primary Examiner* — Jue Zhang
(74) *Attorney, Agent, or Firm* — Yakov S. Sidorin; Quarles & Brady LLP

(57) ABSTRACT

A method is shown to create soft transition in selected topologies by controlling and designing the magnetizing current in the main transformer to exceed the output current at a certain point in the switching cycle.

9 Claims, 4 Drawing Sheets

SOFT SWITCHING CONVERTER BY STEERING THE MAGNETIZING CURRENT

RELATED APPLICATION/CLAIM OF PRIORITY

This application is related to and claims priority from U.S. provisional application Ser. No. 61/821,896, filed May 10, 2013 which provisional application is incorporated by reference herein.

INTRODUCTION

Traditional pulse width modulation (PWM) controlled converters have been around for a long time. They have some characteristics which are useful. The current waveforms in continuous mode versions are square and have low root mean square (RMS) content compared to resonant converters. But they have hard switching in the primary and reverse recovery problems in the secondary. Because of this there have been some modifications to them to reduce some these draw backs. Almost all of the modifications address soft switching in the primary. But very few address the reverse recovery problem in the secondary.

SUMMARY OF THE PRESENT INVENTION

This invention addresses both problems. Even though the solution proposed increases the RMS current in all switches there are plenty of situations where this would be advantageous. When the output voltage is high most of the losses are not conduction losses but switching losses. This would be a situation where eliminating reverse recovery losses would be beneficial. As metal oxide semi-conductor field effect transistors (MOSFETs) become smaller and more efficient the usefulness of this invention would increase since the conduction losses becomes a smaller component of the overall losses. Therefore, increasing the conduction losses while reducing all switching losses is a trade-off worth making.

The invention presented in this application can be applied to some popular PWM converters. The converters, to which this invention can be applied, are converters with either a half bridge, full bridge, or push pull topology in the primary and with either a current doubler, center tap, or full bridge in the secondary. The only additional constraint is that the secondary must be synchronous rectified and the transformer have low leakage inductance. This invention provides a method that uses old topologies differently to accomplish the goal of soft commutation in all switches.

The present invention provides several basic design and control methods for a converter, and several features which further develop these basic design and control methods.

In one of its most basic aspects, the present invention provides a design and control method for a converter having a transformer and one output choke, where the converter is designed so that the magnetizing current in the transformer exceeds the current through the output choke at its lowest point so that soft transitions are obtained on all the switching elements.

In another of its basic aspects the present invention provides a design and control method for a converter having a transformer and one or more output choke(s), where the converter is designed so that the magnetizing current in the transformer exceeds the current through one of the output choke(s) at its lowest point so that soft transitions are obtained on all the switching elements.

In still another of its basic aspects, the present invention provides a design and control method for a converter having one or more transformer(s) and one or more output choke(s), where the converter is designed so that the resulting magnetizing current of the transformer(s) exceeds the current through one of the output choke(s) at its lowest point so that soft transitions are obtained on all the switching elements.

In yet another of its basic aspects, the present invention provides a design and control method for a converter having a transformer and one output choke, at least two primary switching devices and at least two rectifying means in the secondary, where each of the primary switching devices is off when a correspondent rectifier means is on. The converter is designed so that the magnetizing current in the transformer exceeds the current through the output choke at its lowest point so that the current through one of the rectifier means becomes zero or negative and that this rectifier means is turned off prior to the turn on of a correspondent primary switching device. In a further development of this design and control method, the amount of negative current through the rectifier means and the time between turn off of the rectifier means and turn on of the correspondent primary switching device is tailored that the correspondent primary switching device turns on at zero voltage switching conditions.

In yet another of its basic aspects, the present invention provides a design and control method for a converter having a transformer and one or more output choke(s), at least two primary switching devices and at least two rectifying means in the secondary, where each of the primary switching device is off when a correspondent rectifier means is on. The converter is designed so that the magnetizing current in the transformer exceeds the current through one of the output choke(s) at its lowest point so that the current through one of the rectifier means becomes zero or negative and that this rectifier means is turned off prior to the turn on of a correspondent primary switching device. In a further development of this design and control method, the amount of negative current through the rectifier means and the time between turn off of the rectifier means and turn on of the correspondent primary switching device is tailored that the correspondent primary switching device turns on at zero voltage switching conditions.

In a still further basic aspect of the invention, a design and control method is provided for a converter having one or more transformer(s) and one or more output choke(s) at least two primary switching devices and at least two rectifying means in, the secondary, wherein each of the primary switching device is off when a correspondent rectifier means is on. The converter is designed so that the resulting magnetizing current in the transformer(s) exceeds the current through one of the output choke(s) at its lowest point so that the current through one of the rectifier means becomes zero or negative and that this rectifier means is turned off prior to the turn on of a correspondent primary switching device. In a further development of this design and control method, the amount of negative current through the rectifier means and the time between turn off of the rectifier means and turn on of the correspondent primary switching device is tailored that the correspondent primary switching device turns on at zero voltage switching conditions.

In a further development for each of the design and control methods described above, the magnetizing current of the converter is tailored through modulation in frequency in a such way, that the claimed conditions do occur over a range of the input voltage and output loading conditions. In addition, the converter is designed as a half bridge, full bridge, push pull, the primary and center tap, current doubler or full bridge rectification in the secondary.

In another further development for each of the basic design and control methods described above, the magnetizing current of the converter is tailored through modulation in frequency in a such way that the claimed conditions do occur over the full range of the input voltage and output loading conditions.

In another further development for each of the basic design and control methods described above, the magnetizing current of the converter is tailored through modulation in frequency in a such way that the claimed conditions do occur over a specific range of the input voltage and output loading conditions.

Since there are many combination of converters to which this invention can be applied, this application will describe with great detail how it can be applied to a half bridge with current doubler converter. In addition, an example using a half bridge with center tap will be presented briefly. From this description, the manner in which the principles of this invention can be applied to various other types of converters will be apparent to those in the art Since magnetizing current will be used for soft switching, the control must adjust the frequency of operation for different load line conditions. Control then in is an important element in this invention. Leveraging modern digital control and intelligent processing would be beneficial to this idea.

These and other features of the present invention will become further apparent from the following detailed description and the accompanying drawings.

DETAILED DESCRIPTION

As described above, the present invention provides a design and control method for a converter having a transformer and one or more output choke(s), which provides soft transitions in all switching devices in the converter. The invention is described herein in connection with several exemplary converters, and from that description the manner in which the principles of the present invention can be applied to various other converters will be apparent to those in the art.

Bridge Converter with Current Doubler Using Magnetizing Current Steering

Figure 1:
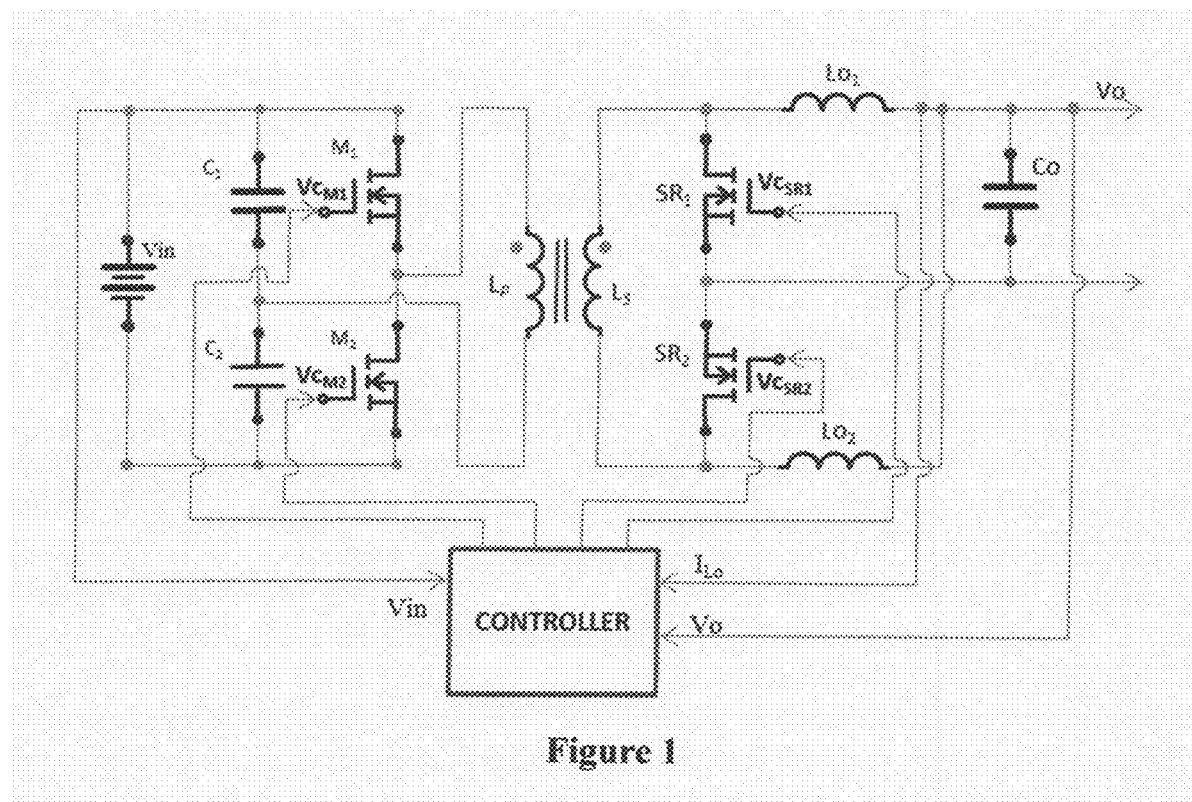
FIG. 1 is an implementation of a half bridge converter with current doubler output, designed according the principles of the present invention.
Figure 2:
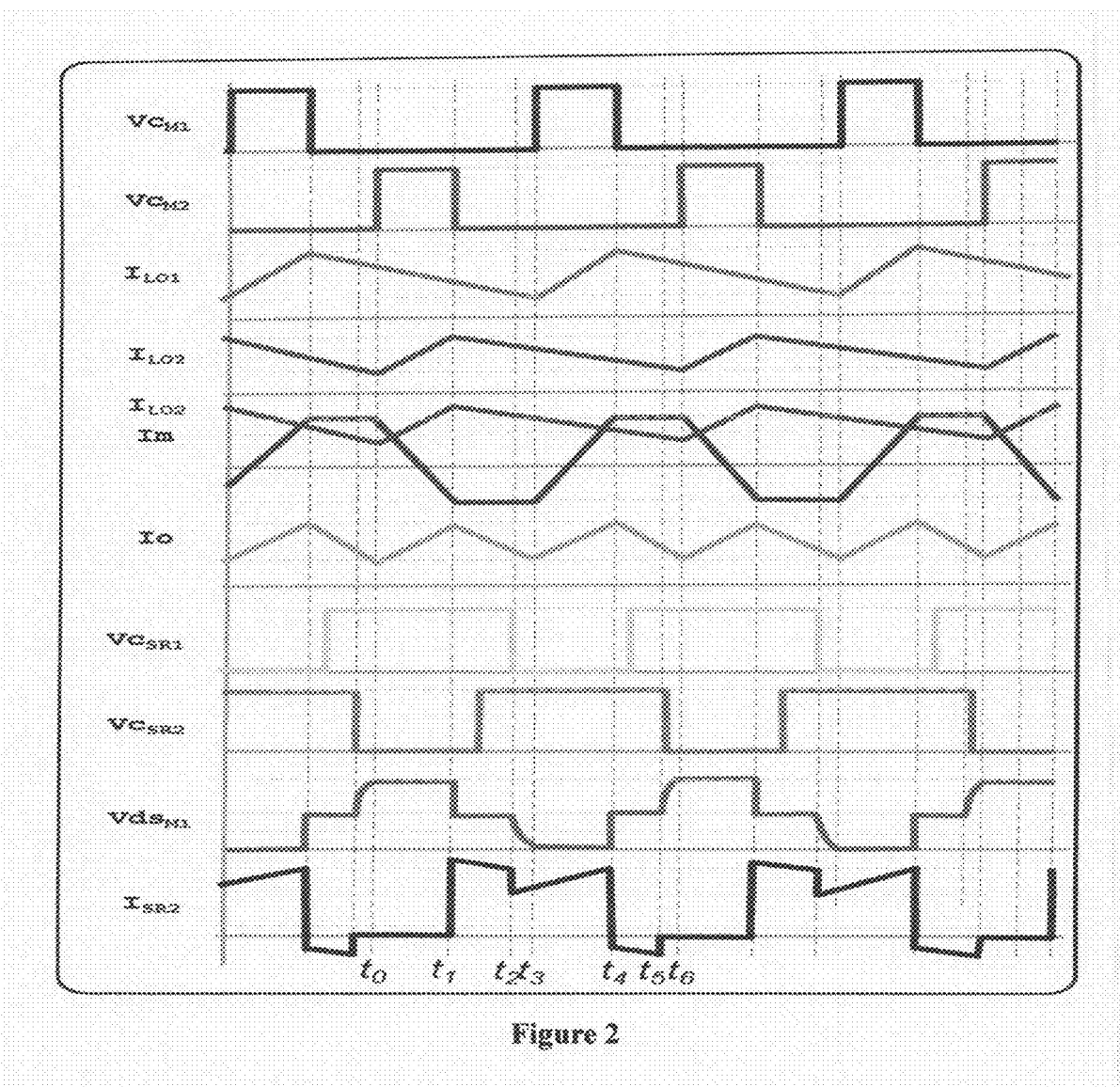
FIG. 2 shows the waveforms for the converter of FIG. 1.

FIG. 1 is an implementation of a half bridge converter with current doubler output. The secondary is comprised of output inductors Lo1 and Lo2, and synchronous rectifiers SR1 and SR2. The synchronous rectifiers are implemented with MOSFETS. Primary half bridge is made up of switches M1 and M2, and blocking capacitors C1 and C2. The transformer inductance is designed so that at specific frequency and duty cycle its magnetizing current is higher than output choke current at its minimum point. The waveforms for this converter are presented in FIG. 2. Note since the condition that the magnetizing current be larger than the output choke minimum current point the output choke can also be designed to meet this target.

At time t0 the converter has primary switch M2 on, SR2 off, SR1 on, and M1 off. The magnetizing current component of the transformer is flowing from M2 source to M2 drain (into the transformer dot on the primary), the choke current in Lo2 is reflected back to the primary and its component flows from M2's drain to source. The magnetizing component at this time must be slightly larger or equal to the reflected current in Lo2 so that there was a zero voltage switching (TVS) transition or a near ZVS transition previous to t0. The current in Lo1 continues to be delivered to the output flowing through SR1, SR1 also contains the output current of Lo2. As the primary switch continues to be on current is ramping up on Lo2 and the magnetizing current decays from going into the dot to zero then reverses and starts to ramp out coming out of the dot. The current Lo1 is ramping down. The file current in M2 is triangular starting from zero or slightly negative and going to a peak current at time t1 where M2 is turned off. The slope of the ramp is composed of the slope of the magnetizing current and the slope of the output choke Lo2.

At time t1 when M2 turns off the current in the primary charges/discharges the parasitic capacitances of M2, M1, and SR2. The voltage on M2 increases while the voltage on SR2 decreases. When the voltage on SR2 becomes zero SR2 is turned on. This happens fairly quickly since the output current plus the magnetizing current both contribute to this voltage movement. The turn on for SR2 could be delayed since the body diode in SR2 automatically turns on but since normally the drop on the body diode is larger than the channel reducing this delay would reduce conduction losses during this time. When SR2 is turned on or clamps the voltage at zero the drain voltage of M2 is held at the same voltage as the voltage on the capacitor node between C1 and C2. This is approximately ½ the input voltage. All accumulated magnetizing current that was flowing in the primary is then transferred to the secondary. In this case the magnetizing current would add to the current in SR2 and would subtract from the current in SR1. Therefore, SR2 would have a current of ILo2+Imag flowing from source to drain, and SR1 would have a current of Io1−Imag flowing from source to drain. The current in SR1 would be very close to zero at t1. Most of conduction losses would be in SR2. The current in Lo1 continues to decay and the current in Lo2 is at the beginning of its decay also.

At time t2 the current in Lo1 is the lowest for the cycle and is lower than the magnetizing current in the secondary winding Ls. This means that the current in SR1 is flowing from drain to source. SR1 is turned off at t2. The excess current flowing in SR1 charges its capacitance and also the capacitances of M1 and M2. The voltage increases in the drain of SR1 and increases across M2 in the primary. Therefore at time t2 the transition that started and stalled at t1 continues on. When the voltage across M2 reaches Vin, the voltage across M1 reaches zero and M1 is turned on (a ZVS condition). This is at time t3.

Time t3 is a repeat of to only for the opposite phase of the converter with all the switch pairs, the choke pair, and the transformer switching roles.

At time t3 the converter has primary switch M1 on, SR1 off, SR2 on, and M2 off. The magnetizing current component of the transformer is flowing from M1 source to M1 drain (into the transformer non-dot on the primary), the choke current in Lo1 is reflected back to the primary and its component flows from M1's drain to source. The magnetizing component at this time must be slightly larger or equal to the reflected current in Lo1 so that there was a ZVS transition or a near ZVS transition previous to t3. The current in Lo2 continues to be delivered to the output flowing through SR2, SR2 also contains the output current of Lo1. As the primary switch continues to be on current is ramping up on Lo1 and the magnetizing current decays from going into the dot to zero then reverses and starts to ramp out coming out of the dot. The current in Lo2 is ramping down. The current in M1 is triangular starting from zero or slightly negative and going to a peak current at time t4 where M1 is turned off. The slope of the ramp is composed of the slope of the magnetizing current and the slope of the output choke Lo1.

At time t4 when M1 turns off the current in the primary charges/discharges the parasitic capacitances of M1, M2, and SR1. The Voltage on M1 increases while the voltage on SR1 decreases. When the voltage on SR1 becomes zero SR1 is turned on. This happens fairly quickly since the output current plus the magnetizing current both contribute to this voltage movement. The turn on for SR1 could be delayed since the body diode in SR1 automatically turns on but since normally the drop on the body diode is larger than the channel reducing this delay would reduce conduction losses during this time. When SR1 is turned on or clamps the voltage at zero the source voltage of M1 is held at the same voltage as the voltage on the capacitor node between C1 and C2. This is approximately ½ the input voltage. All accumulated magnetizing current that was flowing in the primary is then transferred to the secondary. In this case the magnetizing current would add to the current in SR1 and would subtract from the current in SR2. Therefore, SR1 would have a current of ILo1+Imag flowing from source to drain and SR2 would have a current of ILo2−Imag flowing from source to drain. The current in SR2 would be very close to zero at t4. Most of conduction losses would be in SR1. The current in Lo2 continues to decay and the current in Lo1 is at the beginning of its decay also.

At time t5 the current in Lo2 is the lowest for the cycle and is lower than the magnetizing current in the secondary winding Ls. This means that the current in SR2 is flowing from drain to source. SR2 is turned off at t5. The excess current flowing in SR2 charges its capacitance and also the capacitances of M1 and M2. The voltage increases in drain of SR2 and increases across M1 in the primary. Therefore at time t5 the transition that started and stalled at t4 continues on. When the voltage across M1 reaches Vin, the voltage across M2 reaches zero and M2 is turned on (a ZVS condition). This is at time t6. Time t6 matches the same condition as t0 and is the end of one complete cycle.

In order for soil commutation described above to happen, the currents in the transformer and output chokes have to be controlled with frequency and duty cycle. A controller that choses the optimum point is essential. The controller would have to consider load, output voltage, input voltage, and the inductance values of transformer and chokes as parameters and determine the best operating point that would meet the criteria of having enough magnetizing current at time t2 or t5 to be larger than the current in Lo2 or Lo1 respectively. At lighter loads this would become easier but then the controller would have to trade off increasing the frequency and reducing the RMS currents or reducing the frequency and increasing the RMS currents.

Half Bridge Converter with Center Tap Output

Figure 3:
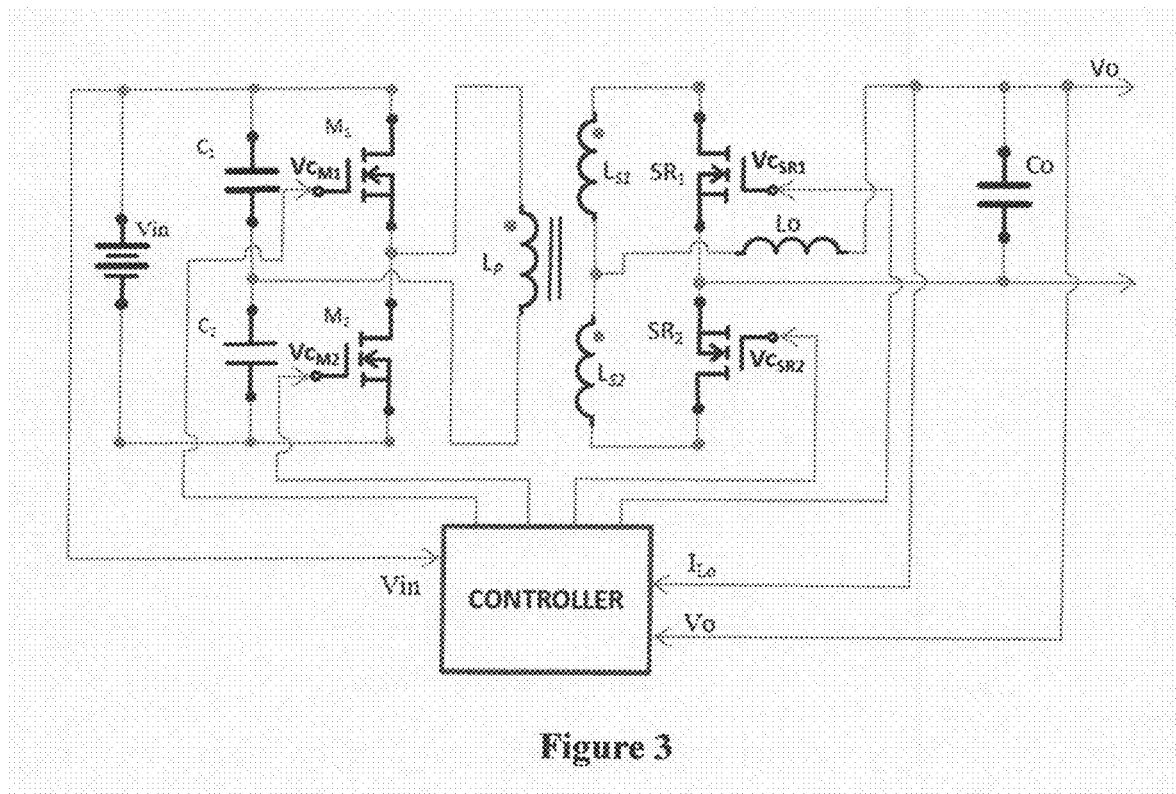
FIG. 3 shows a half bridge converter with a center tap output, and embodying the principles of the present invention.
Figure 4:
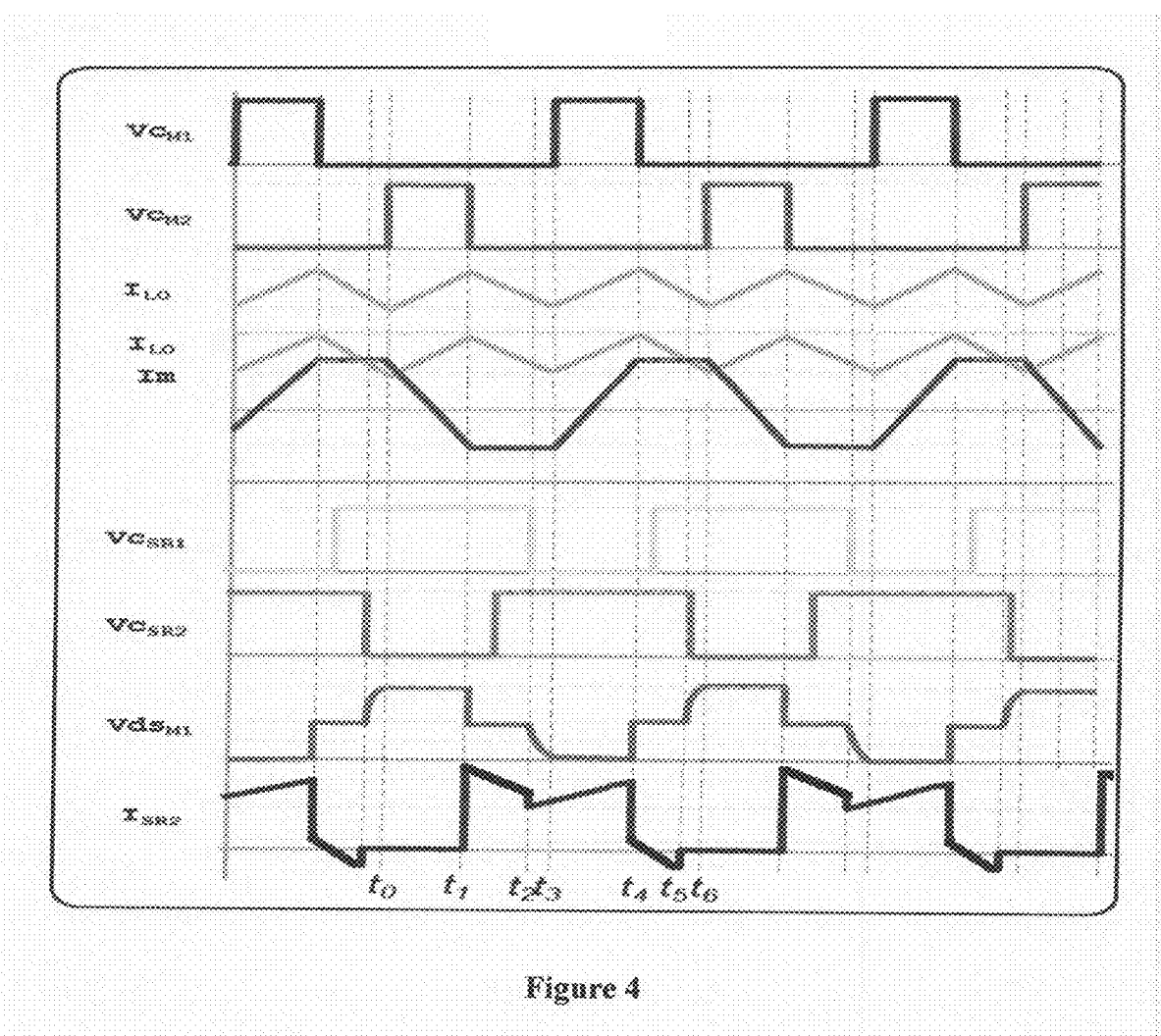
FIG. 4 shoes the waveforms for the converter of FIG. 3.

Shown in FIG. 3 is a half bridge converter with a center tap output. Waveforms for this converter are shown in FIG. 4. This converter would operate similar to current doubler version mentioned above. The waveforms in the primary would be identical to before.

The output choke in this topology operates with lower ripple current and since the output current is contained in one choke the DC current level is double of what the current doubler would be per choke. But during the freewheeling portion between t1 and t2 t4 and t5 the output current is shared between SR1 and SR2 so the amount of magnetizing current that would be needed to reverse the current in SR1 or SR2 would be half the output current. This would make it the same as the current doubler example except for the reduction in choke ripple. The ripple in the choke could become negligible at 50% duty cycle so the magnetizing inductance need would be slightly higher than ½ the output current. This would be applied across both output windings in series (both windings on the secondary must carry this current).

Half bridge converters or Full bridge converters can be stacked on the primary to reduce the voltage and the secondary paralleled to create structures that are tailored to available high performance devices. The magnetizing current in each converter would then be tailored with the same controller.

Thus, as seen from the foregoing description, a design and control method are provided that produce soft transitions in all switching devices in a converter. The method applies to any converter that is composed in the primary or secondary of a half bridge, full bridge, push pull (center tap), or current doubler, and in view of the foregoing description the manner in which the principles of the present invention can be applied to various converter topologies will be apparent to those in the art.

The invention claimed is:

1. A method for operating, at a frequency of operation, a pulse-width modulation (PWM) DC-to-DC converter, wherein said converter includes:
   a primary side and a secondary side;
   a transformer having at least one primary side winding at the primary side and at least one secondary winding at the secondary side;
   first and second primary switching elements at the primary side;
   electronic circuitry configured, as a controller, to generate control signals applied in operation of the converter to said first and second primary switching elements, said control signals having square waveforms;
   first and second synchronous rectifiers at the secondary side;
   at least one output inductor at the secondary side, wherein a first terminal of said at least one output inductor that is not connected to a synchronized rectifier is configured to be connected to a load of said converter;
the method comprising:
a) switching on the first primary switching element by applying thereto a first control signal having a square waveform and, while the first primary switching element is on and while the first synchronized rectifier is on, transferring power from the primary side to the secondary side of said converter,
   wherein said transferring is characterized by (i) linearly changing, with time, an amplitude of current flowing through the at least one output inductor and (ii) linearly increasing an amplitude of magnetizing current of said transformer to a peak amplitude of the magnetizing current;

b) after switching off the first primary switching element, continuing said transferring power and continuing said linearly changing of the amplitude, of the current flowing through the at least one output inductor, to a lowest value of said amplitude while maintaining the magnetizing current at the peak amplitude;

c) while the first primary switching element is off, switching on the second primary switching element by applying thereto, after the peak amplitude of the magnetizing current exceeds the lowest value of said amplitude, a second control signal having a square waveform to achieve a zero-voltage switching condition in the secondary side; and d) controlling said transferring power in said converter by modulating a width of a pulse of a voltage control signal from the first and second control signals.

2. The method according to claim 1, further comprising
switching off the second synchronized rectifier, and
discharging parasitic capacitances of the first and second primary switching elements of said converter before said second synchronized rectifier is switched on again.

3. The method according to claim 2, wherein said switching off the second synchronized rectifier includes switching off the second synchronized rectifier prior to a moment when the second primary switching element is switched on.

4. The method according to claim 1, wherein in step a), said transferring power from the primary side to the secondary side is characterized by (i) linearly increasing an amplitude of first current flowing through the first output inductor while linearly decreasing an amplitude of second current flowing through the second output inductor.

5. The method according to claim 1, further comprising:
after the first primary switching element is switched off and the second primary switching element is switched on, tailoring
i) an amount of negative current through the second synchronous rectifier and
ii) a time delay
to turn on the secondary switching element at a zero voltage switching conditions,
wherein the time delay being a time between a moment when the second synchronized rectifier is switched off and a moment when the second primary switching element is switched on.

6. The method according to claim 5, wherein said tailoring is carried out after the second synchronous rectifier is switched off.

7. The method according to claim 1, further comprising controlling the amplitude of the magnetizing current by varying the frequency of operation.

8. The method according to claim 1, wherein said operating the PWM DC-to-DC converter includes operating the PWM DC-to-DC converter configured to have at least one of i) a half-bridge configuration, ii) a full-bridge configuration, and iii) a push pull configuration in the primary side and at least one of a) a center tap, b) a current doubler, and c) a full-bridge rectification configurations in the secondary side.

9. The method according to claim 1, wherein said operation is carried out in a continuous mode.

* * * * *